Nov. 25, 1930.  E. E. TOWNSEND  1,782,914

SPEEDOMETER TESTING MACHINE

Filed July 18, 1928

INVENTOR.
Elvin E. Townsend.
BY Townsend, Loftus & Abbett
ATTORNEYS.

Patented Nov. 25, 1930

1,782,914

UNITED STATES PATENT OFFICE

ELVIN E. TOWNSEND, OF WATSONVILLE, CALIFORNIA

SPEEDOMETER-TESTING MACHINE

Application filed July 18, 1928. Serial No. 293,698.

This invention relates to devices for testing speedometers.

It is the principal object of the present invention to provide a simple and inexpensive device for accurately testing automobile speedometers and their driving connections to determine their accuracy under the conditions in which they normally operate.

In carrying out this object into practice, I provide a master speedometer connected with a driving medium. This latter is driven by the wheels of the automobile containing the speedometer to be tested. This permits the two speedometers to operate in unison and enables the readings thereof to be compared.

One form which the invention may assume is exemplified in the following description and illustrated by way of example in the accompanying drawings, in which.

Figure 1:
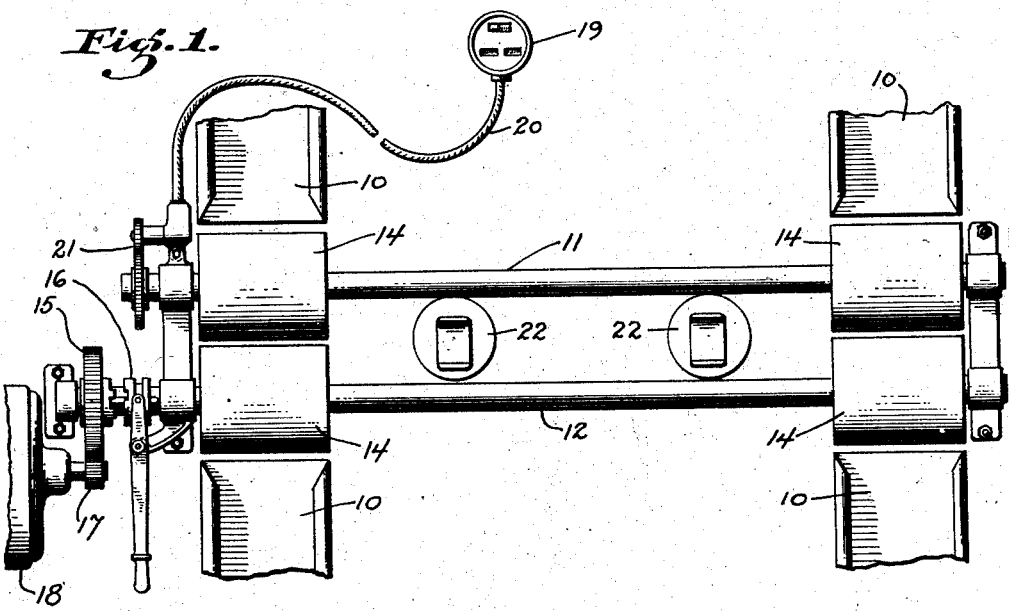
Fig. 1 is a view in plan of a device embodying the preferred form of my invention.
Figure 2:
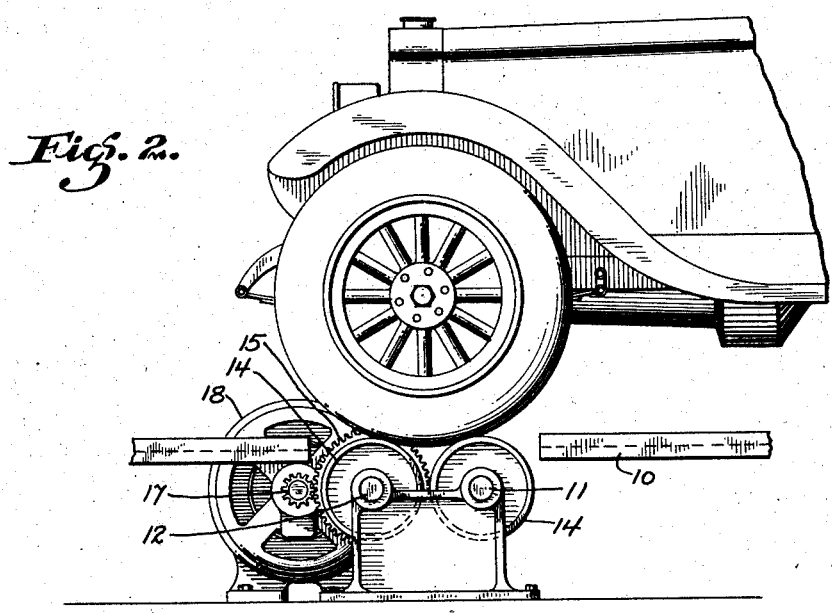
Fig. 2 is a side elevation of the same.

Referring more particularly to the accompanying drawings, 10 indicates a pair of tracks having a gauge equal to the tread of an automobile. Arranged transversely of the tracks is a master speedometer drive shaft 11 and a transmission shaft 12 which are arranged at a spaced distance apart in parallelism and journalled in suitable bearings. Each of these shafts is fitted with a pair of rollers 14 interposed in the tracks which are cut away so that an automobile may be driven upon the tracks and either the front or rear wheels thereof arranged on the rollers 14. The shafts 11 and 12 are so arranged that adjacent rollers of each pair will align with a track and will be disposed closely adjacent so that wheels bearing on the rollers will have driving contact with all of them.

The transmission shaft is fitted with a gear 15 which is loose on the shaft and formed with a clutch face on its hub. A shiftable clutch member 16 is feathered on the shaft and capable of connecting the gear 15 to or disconnecting it from the shaft 12.

The gear 15 is in mesh with a pinion 17 keyed or otherwise secured on the shaft of a variable speed electric motor 18. By operating this motor 18 the transmission shaft may be driven at various speeds.

A master speedometer 19 is provided which is fitted with a flexible drive shaft 20. This latter is driven by the shaft 11 thru the medium of gears 21. The ratio between these gears is such that the master speedometer will be operated to indicate the peripheral speed of the rollers 14 in miles per hour. Therefore, when the rollers engage the wheels of an automobile and are driven simultaneously with these wheels, the readings of both the speedometer in the car and the master speedometer should correspond. Likewise, the distance readings on both speedometers should be exactly the same.

In operation of the device the automobile containing the speedometer to be tested is driven on the tracks and its wheels arranged on the rollers. If the automobile speedometer is driven from the front wheels of the car, these wheels are arranged on the rollers.

In order that the wheels will bear with proper pressure on the rollers 14, I provide hydraulic or other jacks 22 between the tracks to relieve a portion of the weight of the car if desired.

If the speedometer is driven from the front wheels of the car it is necessary to drive these wheels to test the speedometer. This is accomplished by placing the motor 18 in operation and clutching the gear 15 to the transmission shaft causing a drive to be transmitted to the rollers 14 on the transmission shaft. As these rollers are in driving contact with the automobile wheels, the latter will be driven and will in turn drive the rollers on the speedometer drive shaft causing operation of the master speedometer. As the linear speed of the rollers and automobile wheels will be the same the readings of the two speedometers should correspond. If they do not, the one in the car is adjusted until accurate.

It often occurs that a speedometer will indicate the road speed correctly at some speeds but incorrectly at others. For this reason I provide a variable speed motor in order that the speedometer may be tested at all speeds.

If the speedometer is driven from the drive shaft of the car, the rear wheels of the car are arranged on the rollers 14. The engine of the car is placed in operation and a driving connection established between the engine and the rear wheels to drive the latter. These wheels transmit a drive to the rollers 14 on the speedometer drive shaft to operate the master speedometer. A test is then conducted at various speeds to compare the readings of the speedometers. When the rear wheels of a car are on the rollers 14, the gear 15 is disconnected from the shaft 12 so that rollers 14 on this latter shaft will merely idle.

After the test has been conducted the car speedometer is properly adjusted and the car removed from the tracks.

From the foregoing, it is obvious that by means of my improved device a speedometer in an automobile may be tested under ordinary road conditions. Further, this test enables the speedometer readings to be compared with that of an accurate speedometer driven simultaneous therewith and without disconnecting the speedometer being tested from its driving mechanism. This insures that both the speedometer and its driving mechanism will be tested and any inaccuracies therein discovered.

While I have disclosed the preferred embodiment of my invention, it is to be understood that various changes may be made therein without departing from the spirit of the invention as defined in the appended claims.

Having thus described my invention, what I claim and desire to secure by Letters Patent is:

1. A speedometer testing device comprising a master speedometer drive shaft adapted to be actuated solely by the wheels of an automobile, a transmission shaft spaced from and arranged in parallelism with the said drive shaft and cooperating therewith to support a pair of wheels of an automobile, a master speedometer geared to the drive shaft, a motor, and means for connecting the motor with and disconnecting the motor from the transmission shaft to enable the said wheels of the automobile to be actuated either by the said motor or by the motor of the automobile.

2. A speedometer testing device including a master speedometer drive shaft provided with a pair of rollers, a master speedometer, gearing connecting the master speedometer with the said drive shaft, a transmission shaft spaced from the drive shaft and provided with a pair of rollers cooperating with the rollers of the drive shaft to support the wheels of an automobile, the said drive shaft being actuated solely through contact with the said automobile wheels, a motor, gearing for communicating motion from the motor to the transmission shaft, and a clutch for connecting and disconnecting the motor from the transmission shaft, whereby the device may be actuated either by the said motor or by the motor of an automobile.

ELVIN E. TOWNSEND.